United States Patent
Trythall (10) Patent No.: US 10,861,372 B2
(45) Date of Patent: Dec. 8, 2020

(54) HEAD MOUNTED DISPLAY WITH EYE TRACKER TO REDUCE IMAGE DISPLAY ARTIFACTS

(71) Applicant: BAE SYSTEMS plc, London (GB)

(72) Inventor: Simon Trythall, Rochester (GB)

(73) Assignee: BAE SYSTEMS plc, London (GB)

(*) Notice: Subject to any disclaimer, the term of this patent is extended or adjusted under 35 U.S.C. 154(b) by 253 days.

(21) Appl. No.: 15/767,225

(22) PCT Filed: Oct. 3, 2016

(86) PCT No.: PCT/GB2016/053066
§ 371 (c)(1),
(2) Date: Apr. 10, 2018

(87) PCT Pub. No.: WO2017/064467
PCT Pub. Date: Apr. 20, 2017

(65) Prior Publication Data
US 2019/0073936 A1    Mar. 7, 2019

(30) Foreign Application Priority Data
Oct. 13, 2015 (GB) .................................. 1518110.0

(51) Int. Cl.
*G09G 3/20* (2006.01)
*G06F 3/01* (2006.01)
(Continued)

(52) U.S. Cl.
CPC ....... *G09G 3/2022* (2013.01); *G02B 27/0093* (2013.01); *G02B 27/017* (2013.01);
(Continued)

(58) Field of Classification Search
None
See application file for complete search history.

(56) References Cited

U.S. PATENT DOCUMENTS

| 5,764,202 A | 6/1998 | Welch et al. |
| 7,593,026 B2 * | 9/2009 | Turner ................... G09B 9/307 |
| | | 345/3.1 |

(Continued)

FOREIGN PATENT DOCUMENTS

| EP | 1722342 A1 | 11/2006 |
| EP | 2159752 A1 | 3/2010 |

(Continued)

OTHER PUBLICATIONS

GB Combined Search and Examination Report under Sections 17 and 18(3) received for GB Application No. 1616775.1, dated Mar. 15, 2017. 6 pages.

(Continued)

*Primary Examiner* — Amare Mengistu
*Assistant Examiner* — Sarvesh J Nadkarni
(74) *Attorney, Agent, or Firm* — Finch & Maloney PLLC (57) ABSTRACT

A method and apparatus are provided for controlling a digital display device to generate an image for display, wherein the display device is arranged to generate the image as an array of pixels each of a defined brightness achieved by emitting a respective combination of light pulses of durations defined according to a predetermined pulse width modulation (PWM) scheme. Whereas, under conventional PWM schemes, each light pulse would be emitted by the same pixel of a display device, in the present invention rate data from an associated tracker system and data defining predetermined characteristics of the display and operation thereof are used to calculate a pixel displacement in respect of each defined pulse of the PWM scheme. The pixel displacement is used to modify control data defining those pixels to be activated to emit the defined pulse such that a different pixel to that intended emits the pulse during relative movement of the direction of gaze of a user's eye and the (Continued)

display apparatus. This has the effect of reducing unwanted display artefacts during such relative movement which are prevalent in conventional digital display systems.

25 Claims, 6 Drawing Sheets

(51) Int. Cl.
*G02B 27/01* (2006.01)
*G09G 3/00* (2006.01)
*G02B 27/00* (2006.01)

(52) U.S. Cl.
CPC ......... *G02B 27/0179* (2013.01); *G06F 3/012* (2013.01); *G06F 3/013* (2013.01); *G09G 3/001* (2013.01); *G09G 3/003* (2013.01); *G02B 2027/014* (2013.01); *G02B 2027/0118* (2013.01); *G02B 2027/0187* (2013.01); *G09G 2310/0235* (2013.01); *G09G 2320/0261* (2013.01); *G09G 2320/0266* (2013.01); *G09G 2340/0464* (2013.01)

(56) References Cited

U.S. PATENT DOCUMENTS

| | | | |
|---|---|---|---|
| 8,970,495 | B1 | 3/2015 | Biffle et al. |
| 9,761,055 | B2 | 9/2017 | Miller |
| 2014/0176591 | A1 | 6/2014 | Klein et al. |
| 2014/0247286 | A1 | 9/2014 | Chi |
| 2014/0375679 | A1 | 12/2014 | Margolis et al. |
| 2017/0068091 | A1 | 3/2017 | Greenberg |

FOREIGN PATENT DOCUMENTS

| | | |
|---|---|---|
| EP | 3014868 B1 | 2/2018 |
| WO | 2011018655 A2 | 2/2011 |
| WO | 2014172151 A1 | 10/2014 |
| WO | 2017/064467 A1 | 4/2017 |
| WO | 2017/064468 A1 | 4/2017 |
| WO | 2017/064469 A1 | 4/2017 |

OTHER PUBLICATIONS

GB Combined Search and Examination Report under Sections 17 and 18(3) received for GB Application No. 1616786.8, dated Feb. 27, 2017. 5 pages.
GB Combined Search and Examination Report under Sections 17 and 18(3) received for GB Application No. 1616782.7, dated Mar. 31, 2017. 5 pages.
GB Search Report under Section 17(5)received for GB Application No. 1518110.0 dated Mar. 1, 2016. 3 pages.
GB Search Report under Section 17(5)received for GB Application No. 1518112.6, dated Mar. 1, 2016. 3 pages.
GB Search Report under Section 17(5)received for GB Application No. 1518113.4, dated Mar. 1, 2016. 3 pages.
International Search Report and Written Opinion Received for PCT Application PCT/GB2016/053066, dated Jan. 2, 2017. 13 pages.
International Search Report and Written Opinion Received for PCT Application PCT/GB20161053067, dated Dec. 5, 2016. 13 pages.
International Search Report and Written Opinion Received for PCT Application PCT/GB20161053069, dated Jan. 2, 2017. 15 pages.
International Preliminary Report on Patentability received for PCT Application PCT/GB2016/053066, dated Apr. 26, 2018. 10 pages.
International Preliminary Report on Patentability received for PCT Application PCT/GB2016/053067, dated Apr. 26, 2018. 10 pages.
International Preliminary Report on Patentability received for PCT Application PCT/GB2016/053069, dated Apr. 26, 2018. 11 pages.

* cited by examiner

HEAD MOUNTED DISPLAY WITH EYE TRACKER TO REDUCE IMAGE DISPLAY ARTIFACTS

BACKGROUND

This invention relates to digital displays and in particular, but not exclusively, to head or helmet-mounted digital displays for which images are generated and displayed using digital techniques. The invention provides a method and apparatus for generating images for viewing in digital displays in such a way as to reduce the perception of unwanted display artefacts arising when there is rapid relative movement of the display and a viewer's direction of gaze.

In conventional digital display systems, images may be generated by a display device in the form of an array of pixels in which the perceived brightness of each pixel during any given image refresh period—typically based upon an image refresh rate of 50 or 60 Hz—is achieved by causing the pixel to emit pulses of light defined according to a pulse width modulation (PWM) scheme. Typical display devices used to display images in digital display systems include Digital Micro-mirror Devices (DMDs) and Liquid Crystal on Silicon (LCoS) devices which may be controlled at the pixel level to reflect or transmit incident light, respectively, from a light source.

However, one known problem with such digital image generation techniques arises in transparent head or helmet-mounted displays (HMDs) when there is rapid relative movement of the HMD, at which a generated collimated image is being viewed overlain on an external scene, and the direction of gaze of the viewer. This problem is particularly noticeable when a viewer is observing an external scene against which a so-called 'space-stabilised' symbol is being displayed; the space-stabilised symbol intended to appear in the display overlain at a fixed position relative to a line of sight to a point in the external scene, irrespective of head movement. The pixels displaying the space-stabilised symbol may appear to have different brightness levels to those intended.

SUMMARY

According to a first aspect of the present invention, there is provided a method for controlling a digital display device to generate an image for viewing by a user at a display, wherein the display device is arranged to generate the image as an array of pixels each of a defined brightness achieved by emitting a respective combination of light pulses of durations defined according to a predetermined pulse width modulation (PWM) scheme, the method comprising the steps:
(i) receiving image data defining a required brightness level for one or more pixels during an image refresh period;
(ii) determining control data defining those pixels required to emit a light pulse of each defined pulse duration of the PWM scheme to achieve the respective required pixel brightness levels;
(iii) receiving rate data from an associated tracker system, or deriving rate data from orientation data output therefrom, defining a rate of movement of a direction of gaze of an eye of the user relative to the display;
(iv) calculating, using the rate data from step (iii) and using data defining predetermined characteristics of the display and operation thereof, a pixel displacement in respect of each defined pulse of the PWM scheme to be applied to modify the control data determined at step (ii) in respect of each pixel to compensate for the relative movement; and
(v) outputting the modified control data to the display device.

By this method, during a given image refresh period when there is rapid relative movement of the display and the direction of a user's gaze, each light pulse intended, according to the PWM scheme, for output by one particular pixel of a display device may be output by a different, neighbouring pixel, the extent of the pixel displacement for each light pulse being proportional to the rate of relative movement, taking account of certain predetermined assumptions and characteristics of the display.

The predetermined characteristics may include predetermined relative timings of light pulses of each available duration as defined according to the predetermined PWM scheme. The relative timings may be determined with respect to the timing of the first pulse within an image refresh period. The mid-point of each pulse may be used in determining the relative timings. The pixel displacement also depends upon the angular size of a pixel of the display.

In an example embodiment, at step (iii) the rate data are generated to define a rate of movement in the direction of gaze of the eye of the user relative to the display both in azimuth and in elevation. Having the rate data available separately in azimuth and in elevation enables a pixel displacement to be calculated in azimuth separately from a pixel displacement in elevation such that the displaced pixel position is calculated as a vector displacement whose components comprise the separately calculated displacements in azimuth and in elevation.

In an example embodiment, at step (iv) the pixel displacement is calculated as an integer number of pixels in azimuth and in elevation relative to an intended pixel position. This provides for a useful improvement in displayed image quality while avoiding certain complications in adjusting the grey-scale levels of neighbouring pixels as may be required if attempting to compensate for pixel displacements with sub-pixel resolution.

In an example embodiment, the received image data define pixel brightness as an 8-bit binary number. However, other known representations of pixel brightness levels may be used as input to the method. Furthermore, while the predetermined PWM scheme defines eight different pulse durations of relative duration proportional to a respective power of 2, other known PWM schemes may be applied in which pulse durations proportional to more or less than eight binary and non-binary values may be applied and respective pixel displacements calculated.

In an example embodiment, the tracker system may be an eye tracker system arranged to determine changes in gaze direction of the user's eye relative to the display.

In a further example embodiment, the display may be a head or helmet-mounted display (HMD) and the tracker system may comprise means for determining changes in orientation of the HMD which, when the image comprises a feature intended to appear to a user of the HMD to be in fixed position relative to line of sight to a point in inertial space, may be used to indicate relative movement of the direction of gaze of the user and the HMD, so enabling compensation for relative movement of the HMD and the direction of gaze of the user's eye arising from the vestibulo-ocular reflex.

According to a second aspect of the present invention, there is provided a digital display apparatus having advantages corresponding to those of the method according to the first aspect, comprising:

a display device arranged to generate an image for display as an array of pixels; and an image processor for controlling the display device to generate an image according to a predetermined pulse width modulation (PWM) scheme whereby a defined pixel brightness is achieved at the display device as a respective combination of light pulses, emitted by the display device within an image refresh period, of durations defined according to the PWM scheme, wherein the image processor is arranged:

to receive image data defining a required brightness level for one or more pixels during an image refresh period;

to receive rate data defining a rate of relative movement of a display of the apparatus and a direction of gaze of an eye of a user;

to determine control data defining those pixels required to emit a light pulse of each defined pulse duration according to the PWM scheme to achieve the pixel brightness levels defined in the received image data;

to calculate, using the received rate data and using data defining predetermined characteristics of the display apparatus and operation thereof, a pixel displacement in respect of each defined pulse of the PWM scheme to be applied to modify the determined control data in respect of each pixel to compensate for the relative movement; and to output the modified control data to the display device.

In an example embodiment of the apparatus, the predetermined characteristics include relative timings of light pulses of each available duration as defined according to the predetermined PWM scheme. The relative timings may be determined with respect to the timing of the first pulse within an image refresh period. The mid-point of each pulse may be used in determining relative timings of pulses.

In an example embodiment of the apparatus, the predetermined characteristics of the display include the angular size of a pixel of the display.

In an example embodiment of the apparatus, the rate data are generated to define a rate of movement of the direction of gaze of the eye of the user relative to the display both in azimuth and in elevation. With such rate data available, the image processor is arranged to calculate a pixel displacement in azimuth separately from a pixel displacement in elevation such that the displaced pixel position is calculated as a vector displacement whose components comprise the separately calculated displacements in azimuth and in elevation.

In an example embodiment of the apparatus, the pixel displacement is calculated as an integer number of pixels in azimuth and in elevation relative to an intended pixel position.

In an example embodiment of the apparatus, the rate data are generated by an eye tracker system arranged to determine changes in gaze direction of the user's eye relative to the display.

In a further example embodiment, the display is a head or helmet-mounted display (HMD) and the received rate data define changes in orientation of the HMD which, when the image comprises a feature intended to appear to a user of the HMD to be in fixed position relative to line of sight to a point in inertial space, may be used to indicate relative movement of the direction of gaze of the user and the HMD.

According to a third aspect of the present invention, there is provided an image processor for a digital display system, arranged to implement the method according to the first aspect of the present invention.

According to a fourth aspect of the present invention, there is provided a computer program product comprising a computer-readable medium, or means for access thereto, storing computer program code which when installed in an image processor of a digital display apparatus and executed, cause the image processor to implement the method according to the first aspect of the present invention.

BRIEF DESCRIPTION OF THE DRAWINGS

Example embodiments of the present invention will now be described in more detail with reference to the accompanying drawings, of which.

DETAILED DESCRIPTION

In a typical digital display system, the perceived brightness of a pixel in a generated image during a 'frame period' or 'image refresh period' is determined by the duration for which the pixel is held in an "on" state during that image refresh period, permitting it to emit/transmit light from an illuminating light source. A digitally generated image may be updated at a typical refresh rate of 60 Hz or 50 Hz giving an image refresh period of 16.667 ms or 20 ms respectively. During any given image refresh period the eye of a viewer is insensitive to variations in pixel light output and so an ony state of a required duration may comprise a sequence of ony states of different lengths, generating a corresponding sequence of light pulses which, in duration, add up during the image refresh period to the required duration.

A desired brightness level for a pixel, for example in the range 0 ('off') to 255 (maximum available brightness) as may be defined in received image data by an 8-bit binary brightness value, may be achieved using a pulse width modulation (PWM) scheme combining, in this 8-bit example, light pulses selected from eight different pulse durations of length proportional to a respective power of 2. That is, a pixel may be switched to an ony state and emit/transmit a pulse of light for a period proportional to any one of the values 128, 64, 32, 16, 8, 4, 2, and 1. As may be seen by referring to FIG. 1a in a representation of such 'binary-weighted' pulse periods, if for example a total pulse duration of half of the image refresh period was required for maximum brightness, then the available pulse periods would be the corresponding binary-weighted fractions of a period of approximately 8.333 ms in the case of a 60 Hz display. In a typical implementation, there may be small time periods inserted between pulses in the scheme shown in FIG. 1a, making slightly less than half of the image refresh period available for a pixel to output light.

An 'on' state would be triggered for a pixel if there is a '1' in the respective bit position in the 8-bit brightness value for the pixel during a given image refresh period. Maximum brightness, in this example 255 ($11111111_2$), is defined by switching a pixel on during all the available periods, in sequence, within the image refresh period. This 8-bit PWM pixel switching scheme may be illustrated as shown in FIG. 1b for a small group of adjacent pixels in a display image area.

Figure 1A:
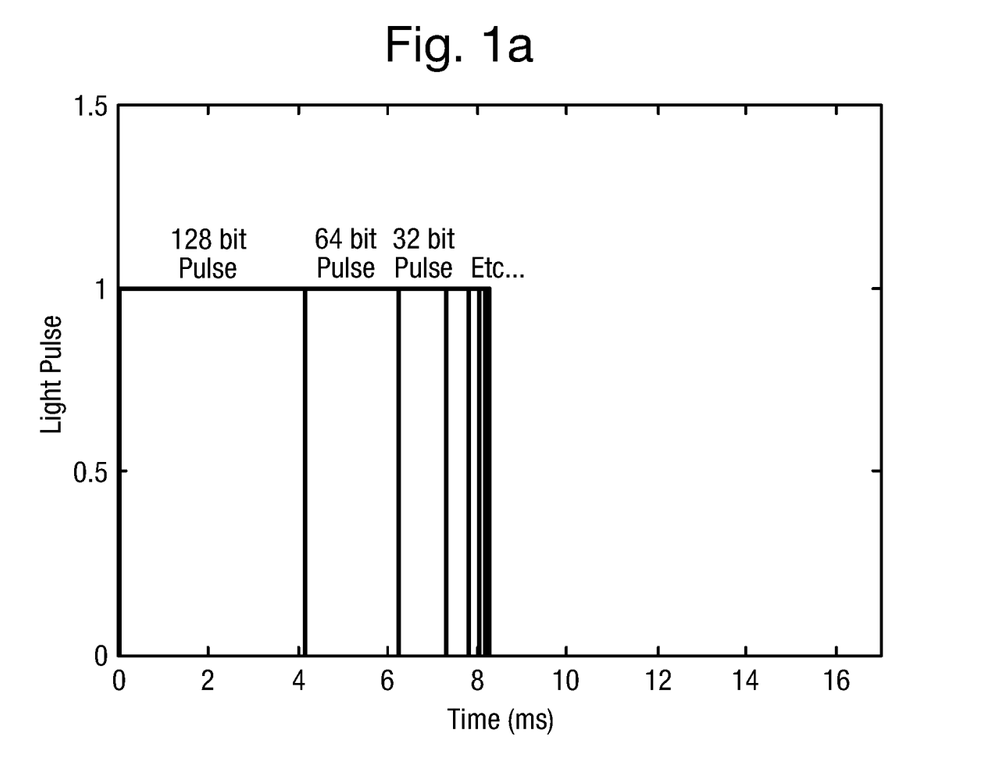
FIG. 1 shows schematically an example known pulse width modulation (PWM) scheme as may be applied to control the state of a number of neighbouring pixels forming a part of the image area of a display.
Figure 1B:
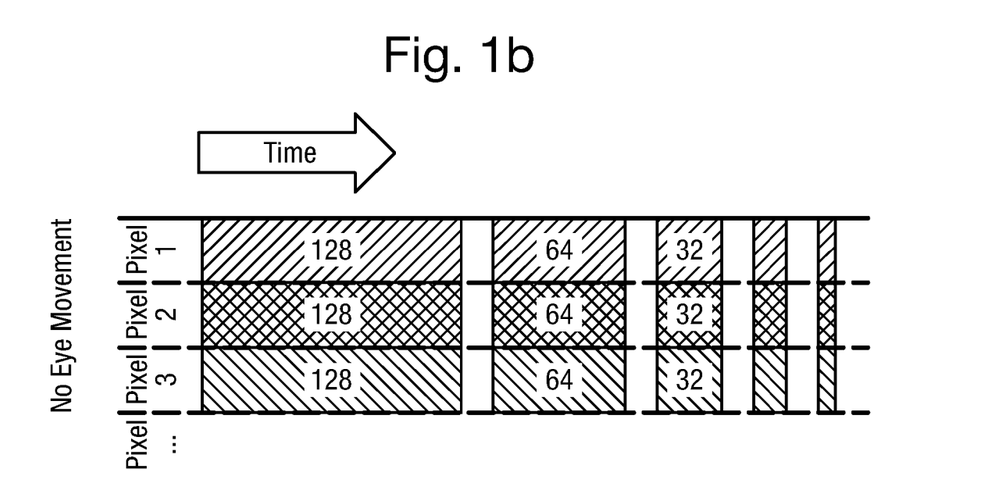

Referring to FIG. 1b, there is shown schematically how each of a number of neighbouring pixels in the image area of a generated image may be triggered to generate light within a given image refresh period as a respective combination of pulses of relative duration defined according to this 8-bit PWM scheme and as shown in FIG. 1a. All of the pixels required to emit a light pulse of duration proportional to the value 128 are illuminated together, followed by all those required to emit a light pulse of duration proportional to the value 64, etc. The control data defining those pixels required to emit a light pulse of each respective duration will be referred to as a 'bit plane' and may be used to control pixel states in a display device of the digital display system. The most heavily-weighted bit plane, defining those pixels are required to emit a light pulse of longest duration '128', may be triggered first, as shown in FIG. 1, followed by the bit plane for pulses of duration '64', etc. However, different bit-plane orderings are possible, for example the reverse order to that shown in FIG. 1. Furthermore, non-binary weighted pulse periods may be included in those available for selection for various reasons, potentially increasing the number of pulses that may be emitted within an image refresh period by a pixel to achieve a given brightness level. Such a scheme is described in co-pending UK patent application no. GB 1504540.4 by the present Applicant, for example.

In a colour display system, a pixel may be illuminated with light from each of a red, green and blue light source, in sequence, within the image refresh period with relative brightness levels being achieving using the above PWM scheme applied to the pixels separately in respect of each colour light source.

In head or helmet-mounted digital display (HMD) systems in which a substantially transparent combiner enables a generated collimated image to appear overlain on an external scene visible through the combiner, this temporal separation of the "on" states for neighbouring pixels is problematic when the display moves rapidly relative to the direction of gaze of the viewer's eye. Such rapid relative movement may be due either to rapid movement of the eye itself to alter the direction of gaze to different features in the external scene (saccadic eye movement), or to movement of the head, and hence of the display, while the eye maintains a fixed gaze upon a feature visible in the external scene (vestibulo-ocular reflex in the case where the fixed direction of gaze is to feature fixed in inertial space). In either case, the result may be that light emitted by a given pixel in respect of different bit planes is received at different points on the retina. This has the effect illustrated in FIG. 2.

Figure 2:
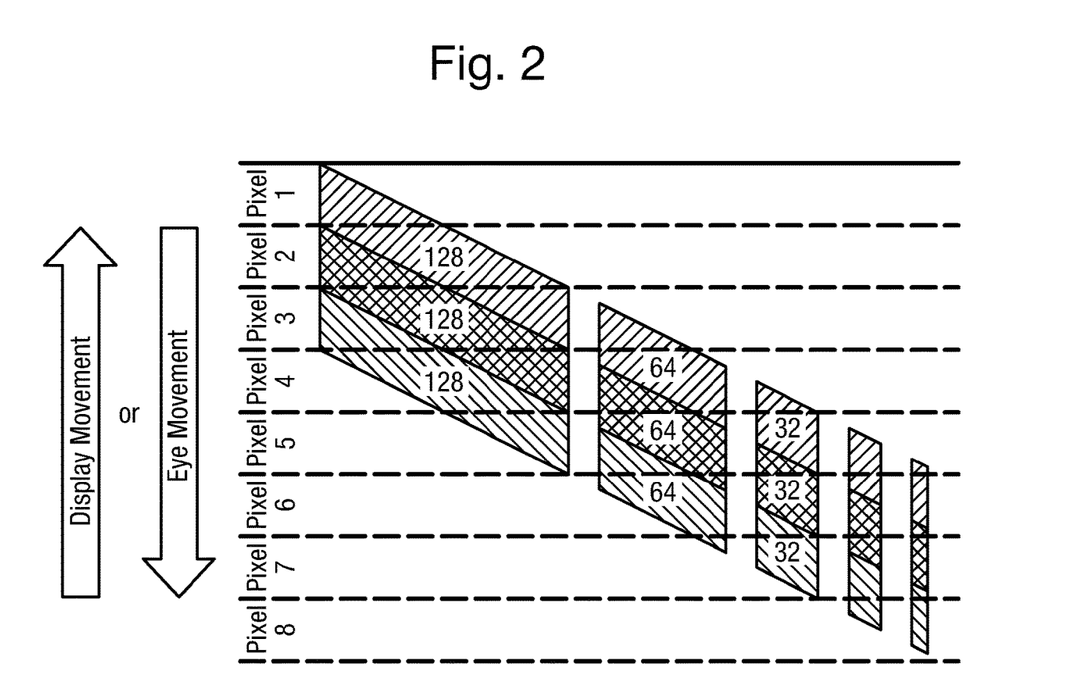
FIG. 2 shows schematically the effect perceived by a viewer of applying the PWM scheme shown in FIG. 1 to the same group of pixels during relative movement of the display and the direction of the viewer's gaze.

Referring to FIG. 2, it can be seen that light generated in respect of any given bit plane is perceived as originating from one or more neighbouring pixels of the intended pixel, shown in FIG. 1, resulting in unwanted display artefacts. This effect is particularly noticeable when displaying so-called 'space-stabilised' symbols in an HMD. A space-stabilised symbol is generated in such a way that it is perceived by the viewer to be fixed in space relative to the viewer's line of sight to a feature in the externally visible scene, irrespective of changes in orientation of the viewer's head and hence of the HMD relative to that line of sight.

A tracker system is provided to determine changes in orientation of the HMD from one image refresh period to the next so that the position in the image area of the space-stabilised symbol may be recalculated to compensate for changes in head and hence of HMD orientation relative to that line of sight. The external feature may be a feature within an enclosed environment such as a cockpit of an aircraft, or a feature visible outside the environment in which the viewer is located. The tracker is able to provide data indicative of the orientation of the HMD relative to a frame of reference of either type of feature, i.e. relative to an aircraft frame of reference or relative to an inertial frame of reference, respectively.

The inventors in the present case have realised that with a knowledge of the rate and direction of movement of the HMD, as may be provided by the tracker system, relative to a line of sight to a feature visible to the viewer in an external scene, the effects illustrated in FIG. 2 may be alleviated or at least reduced in respect of symbols space-stabilised to the inertial frame of reference. It is recognised, in particular, that when displaying space-stabilised symbols referenced to a visible feature in inertial space, the viewer's gaze tends to remain fixed upon a particular line of sight to that feature during head movement. Therefore the rate and direction of change in HMD orientation relative to the externally viewed scene is indicative of the rate and (opposite) direction of movement of the viewer's direction of gaze relative to the display area of the HMD. There is of course no indication of saccadic eye movement by such an HMD tracker system. For this, an eye tracker would be required and may be provided to output data indicative of saccadic eye movement which may be used as an alternative source of line of sight data to those derived from an HMD tracker, enabling embodiments of the present invention to take account of both examples of relative movement of the direction of gaze of a viewer and the HMD.

Data from the tracker system (HMD tracker data or eye tracker data) may therefore be used to calculate displaced pixel positions for each bit plane according to the relative timings of the bit planes within the image refresh period and other predetermined data and assumptions relating to the HMD. This ensures that the first bit plane causes the intended pixels to emit a light pulse of, e.g. '128' duration, while the later bit planes may result in light pulses of respective duration being emitted by other pixels in the neighbourhood of the intended pixel, displaced from the intended pixel position by an amount proportional to the current rate and direction of HMD movement and a known time since the first bit plane was displayed. Pixel displacements over the image area of the display are in the opposite direction to the direction of movement of the HMD and so attempt to follow a point of intersection of the direction of gaze of the viewer's eye and the image area of the display.

An example process for calculating displaced pixel positions for implementation by an image generator of a digital display system will now be described with reference to FIG. 3. The example process may be implemented by an image processing component of, or associated with, the digital HMD system.

Figure 3:
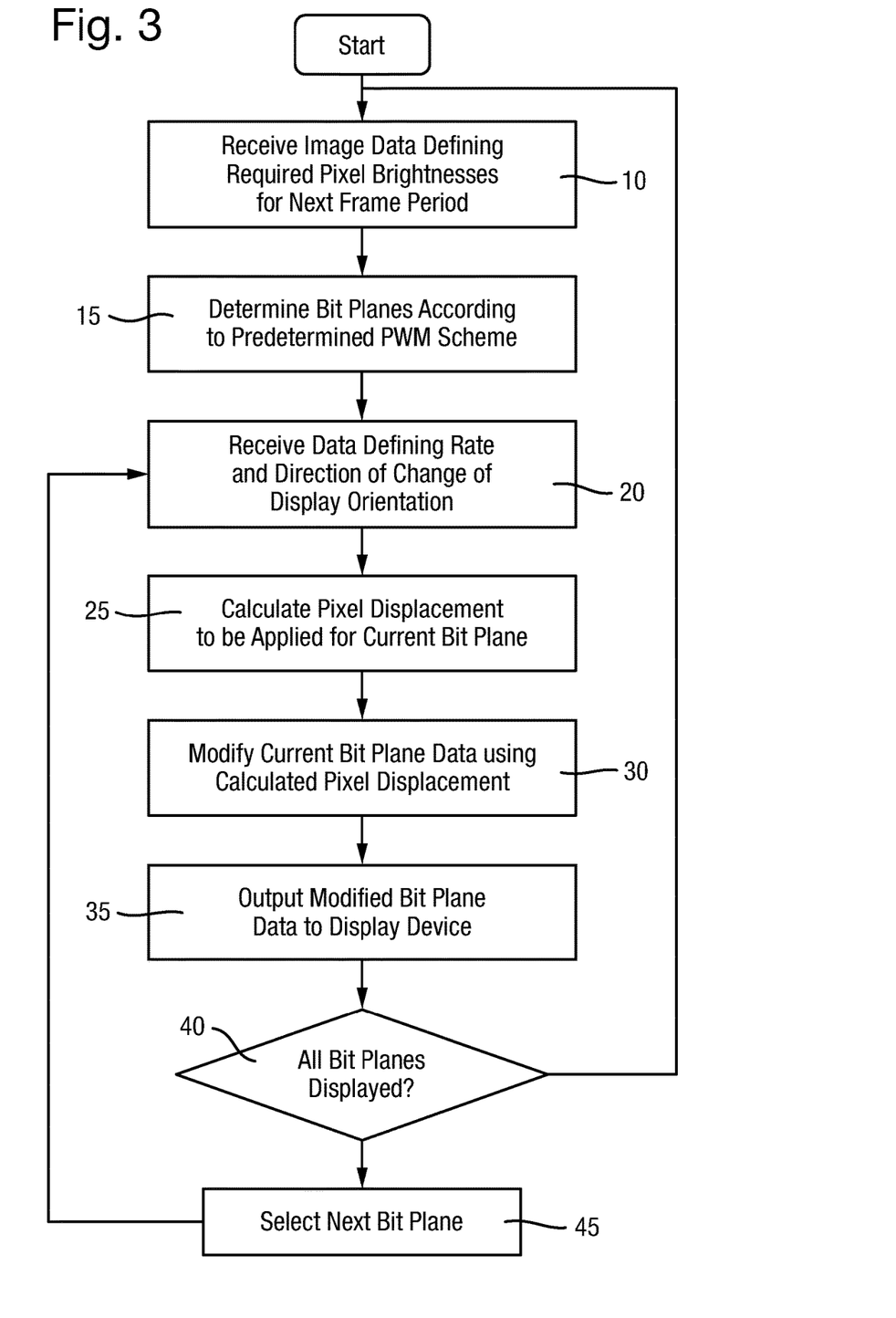
FIG. 3 is a flow chart showing a process for modifying bit planes of data to compensate for relative movement of the display and the direction of gaze of a viewer according to an example embodiment of the present invention.

Referring to FIG. 3, a flow chart is provided showing process steps in generating bit plane data for use by a display device to control pixel states during an image refresh period as defined in received image data. The process begins at STEP 10 in receiving (e.g. 8-bit) image data defining a required brightness level for some or all of the pixels to form an image on the display over the next image refresh period (e.g. 16.667 ms).

At STEP 15, bit planes of data are determined for use by a display device of the HMD system in controlling the state of each pixel of an image area over respective portions of the image refresh period to achieve the required pixel brightness levels according to a predetermined PWM scheme, for example as discussed above.

At STEP 20, data are received from an associated HMD tracker system defining the current rate and direction of change in HMD orientation. Ideally, the data received from the tracker system may comprise predicted data defining rate and direction of change in orientation applicable at the expected time of viewing the pixels activated according to a current bit plane. However, typical tracker systems are likely to be able to update such data only once per image refresh period and so the data from the tracker system may, for example, be synchronised to the mid-point of the time period applicable to the first bit plane and be assumed valid for the remainder of the image refresh period. Typically, the rate data received at STEP 20 comprise the horizontal (azimuthal) and vertical (elevation) components of a rate vector resolved along HMD-referenced axes.

At STEP 25, a pixel displacement is calculated for a current bit plane, using the data received at STEP 20 and a knowledge of the timing of the current bit plane relative to that of the first bit plane, as will be described in more detail below. The calculation may be performed separately for the horizontal and vertical components of a pixel displacement to give a displacement as an integer number of pixels in each direction and hence a net pixel displacement as a vector translation from the intended pixel to a displaced pixel position.

At STEP 30, the calculated pixel displacement is used to modify the current bit plane data, as will be described below, to ensure that pixels at the displaced pixel positions are activated according to the bit plane data rather than the intended pixels. The modified bit plane data are output at STEP 35 to the display device to control the pixel states for the respective portion of the image refresh period.

At STEP 40, if all the bit planes determined at STEP 15 have been displayed at the display device, then the process returns to STEP 10 to receive image data for the next image refresh period. Otherwise, the next bit plane for the image refresh period is selected at STEP 45 from those determined at STEP 15 and the processing resumes at STEP 25 in respect of the newly selected bit plane or, if the tracker system is able to provide updates at a faster rate than once per image refresh period, then processing may resume at STEP 20 to receive updated rate data.

The process STEP 25 may determine, in this example embodiment, each of the horizontal and vertical components of a pixel displacement applicable to a current bit plane n according to the formula:

Required displacement for bit plane $n =$ $$trunc\left(\frac{\left(\frac{E_n + S_n}{2} - \frac{E_{128} + S_{128}}{2}\right) \times r}{p}\right)$$

where p is the angular size of a pixel expressed in radians, r is the horizontal or vertical rotation rate data, resolved along respective HMD-referenced axes, received from the tracker system, $S_n$ is the start time of a light pulse in respect of bit plane n, $E_n$ is the end time of the light pulse in respect of bit plane n, $S_{128}$ is the start time of a light pulse in respect of the bit plane for pulses of relative duration 128, assumed in this example to be the first bit plane during an image refresh period, $E_{128}$ is the end time of the light pulse in respect of the bit plane for pulses of relative duration 128 and the trunc function is intended to truncate any fractional pixel displacement to the lower integer value.

It is assumed for the purposes of this calculation that the roll component in head or helmet movement and hence in HMD movement is negligible and may be ignored. This would typically be the case for HMD applications of the present invention for use in aircraft in which the opportunity for head roll movements is limited.

Truncation of a calculated displacement to an integer number of pixels is intended to avoid complications in interpolating the grey scale brightness levels of pixels to implement sub-pixel contributions of a displaced bit plane. In practice, displacement of bit planes by an integer number of pixels has been found to give beneficial results, but the accuracy and effectiveness of the determined corrections has been found generally to increase with increased resolution.

The mid-points of the time periods applicable for each bit plane have been chosen as the reference points for determining the time differences between pulses. However, alternatively, the start time for each pulse may be selected for this purpose, or some other time point within the periods applicable to each pulse of the PWM scheme.

If the result of the calculation above is a displaced pixel position in either the horizontal or vertical direction beyond the edge of the image area of the HMD, then there will be no contribution to the image by the intended pixel during the period of the current bit plane, and most likely for the remaining bit planes of the current image refresh period. This has the perceived effect of a dimming of the image towards the edges of the image area during rapid HMD movement. However, such dimming has been found preferable to the alternative effects that might arise from, for example, leaving the bit-plane unmodified in respect of those pixels whose bit plane displacements are found to be beyond the edge of the image area.

To give a specific worked example, it will be assumed that the viewer's head and hence the HMD is rotating only in azimuth at a relatively modest rate of 15 deg/s relative to the direction of gaze of a viewer during a given image refresh period and that the angular pixel size is 0.55 milliradians. It will also be assumed that the 8-bit PWM scheme described above is being applied to display pixels of a space-stabilised symbol. Reference will be made to FIGS. 4 to 7 by way of illustration of the effects.

Figure 4:
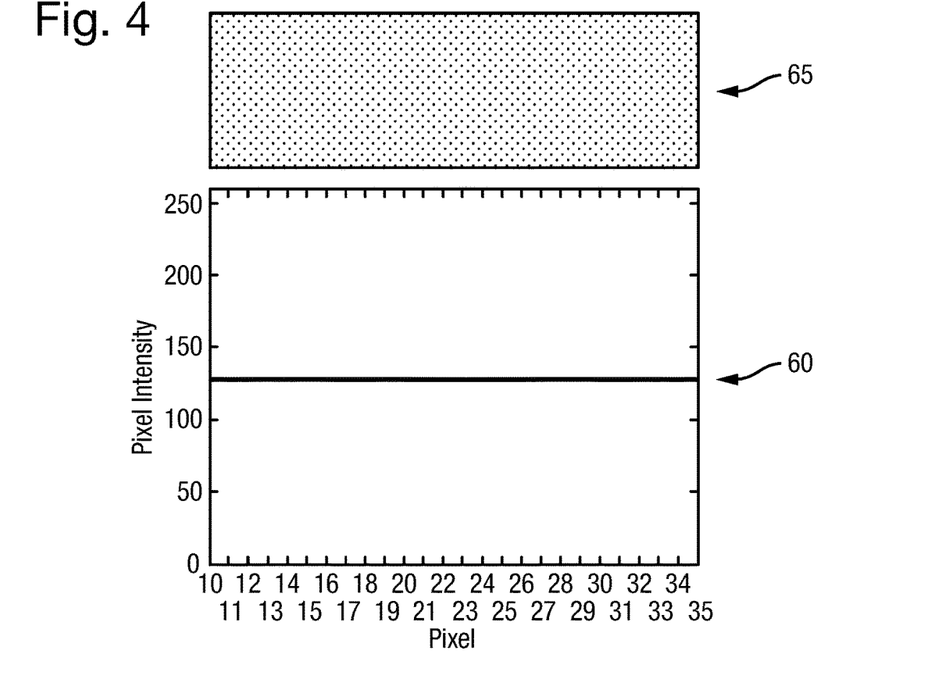
FIG. 4 shows graphically an example of the expected perception by a viewer of the brightness of a line of pixels as intended by received image data in the absence of relative movement between the display and the direction of the viewer's gaze.

Referring firstly to FIG. 4, a graphical representation 60 is provided of the brightness level of a horizontal line of pixels of the space-stabilised symbol, from pixel number 10 to pixel number 35 in which pixels 10 to 20 are intended to have brightness level 128 and pixels 21 to 35 are intended to have brightness level 127. The viewer's intended perception 65 of the line of pixels is shown greatly expanded in width for the purposes of illustration. It will be noted that the difference in brightness between levels 128 and 127 along the line of pixels is substantially imperceptible. The viewer's perception 65 of the distribution of pixel brightness along the line of pixels shown in FIG. 4 is as would be expected when displaying a space-stabilised symbol with little or no relative movement of the HMD and the direction of gaze of the viewer.

Figure 5:
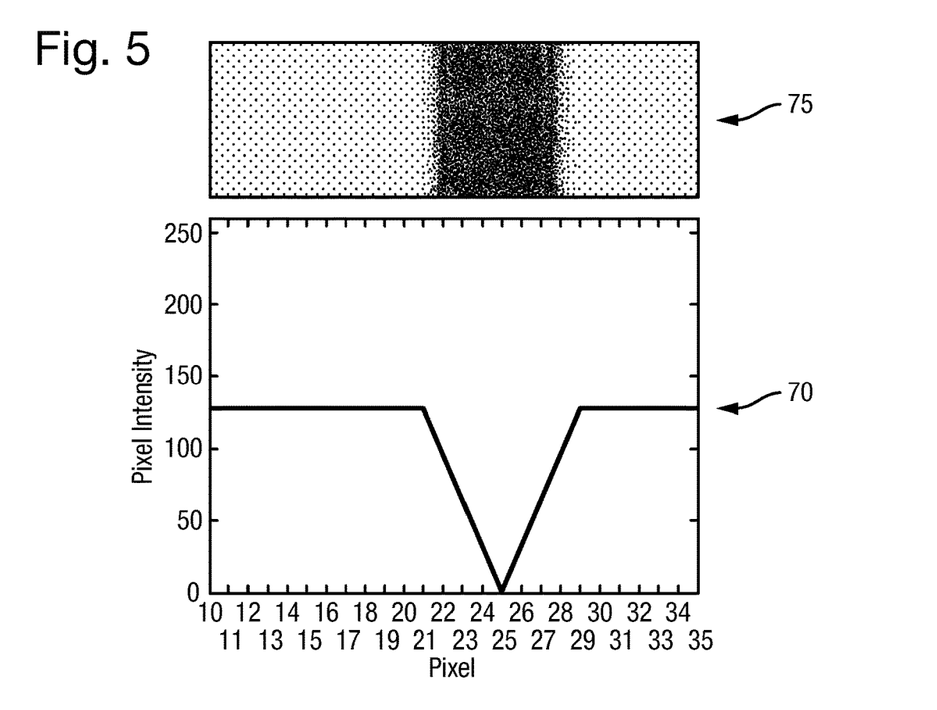
FIG. 5 shows graphically the perceived effect on pixel brightness of an example rate of relative movement of the display and the direction of a viewer's gaze when the display is controlled solely according to the received image data, as represented in FIG. 4.

Referring to FIG. 5, a graphical representation 70 is provided showing how the viewer's perception of pixel brightness along the line of pixels varies from that shown in FIG. 4 during the relative movement of the HMD defined above. As can be seen from the greatly expanded line 75, the viewer's perception is of significantly decreased pixel brightness of pixels 21 to 28 as compared with the intended view 65, with the perceived brightness of pixel 25 dropping substantially to zero.

Figure 6:
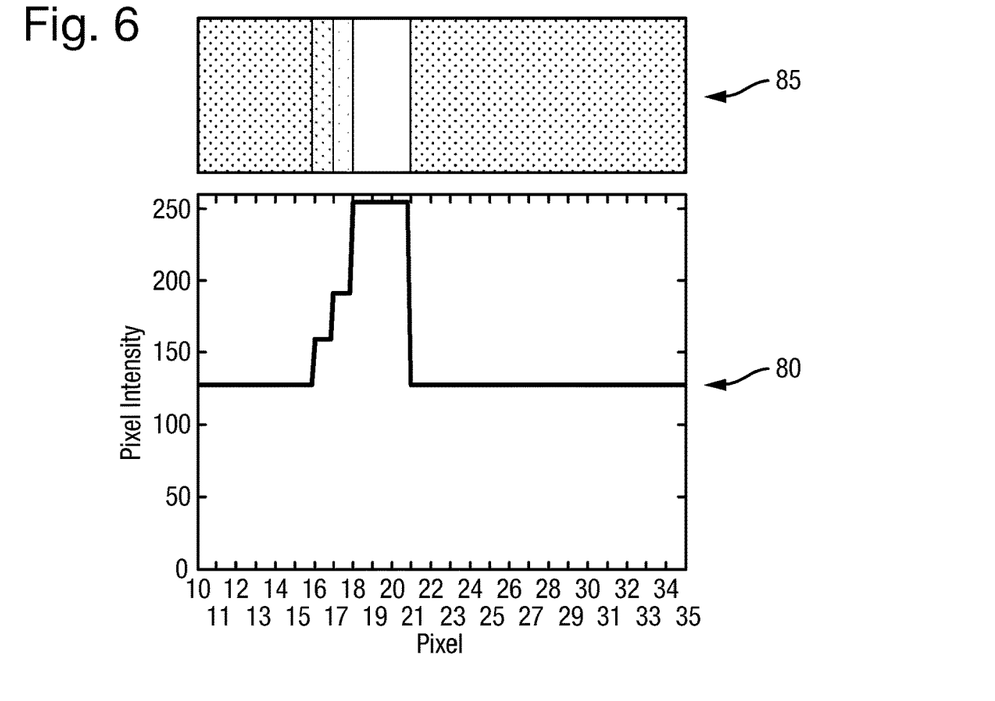
FIG. 6 shows graphically how the light output by the pixels represented in FIG. 4 may be adjusted by example embodiments of the present invention to compensate for the example rate of relative movement of the display and the direction of the viewer's gaze.
Figure 7:
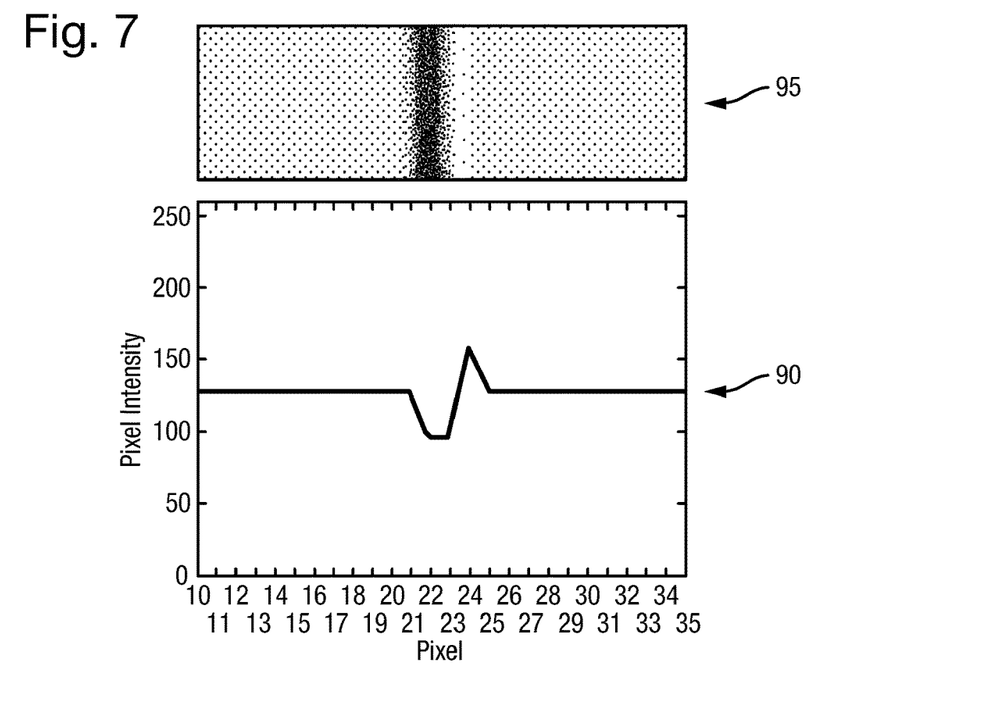
FIG. 7 shows graphically how the perceived effects shown in FIG. 5 may be reduced by applying the corrections to pixel light output represented in FIG. 6 with the example rate of relative movement of the display and the direction of the viewer's gaze.

Referring to FIG. 6, a graphical representation 80 is shown of a correction to overall pixel light output resulting from a modification to the respective bit planes according to the present invention. The distribution of light output by the pixels 10 to 35 as a result of the modification is shown in the greatly expanded view 85. However, this modified pixel light output during the image refresh period, substantially increased for pixels 16 to 20, would not be visible to the viewer experiencing the relative movement of the HMD defined above. Instead, and referring to FIG. 7, the viewer sees the distribution of pixel brightness represented in the graphical representation 90 and as shown in the expanded view 95.

The actual pixel displacements calculated according to the present invention for the bit planes to compensate for the relative movement of the HMD defined above is shown in Table 1, below.

TABLE 1

| Bit plane (bin) | Shift (pixels) |
|---|---|
| 128 | 0 |
| 64 | 3 |
| 32 | 4 |
| 16 | 5 |
| 8 | 5 |
| 4 | 5 |
| 2 | 5 |
| 1 | 5 |

To give a numerical representation of the modified bit planes intended to result in the intended pixel brightness levels for pixels 10 to 20, as shown graphically (60) in FIG. 4, Chart 1 below shows the bit plane data for each of pixels 13 to 23 with the intended overall brightness of those pixels for a respective image refresh period.

CHART 1

| Bit Plane | Pixels → | | | | | | | | | | |
|---|---|---|---|---|---|---|---|---|---|---|---|
| | 13 | 14 | 15 | 16 | 17 | 18 | 19 | 20 | 21 | 22 | 23 |
| 128-bin: | 1 | 1 | 1 | 1 | 1 | 1 | 1 | 1 | 0 | 0 | 0 . . . |
| 64-bin: | 0 | 0 | 0 | 0 | 0 | 0 | 0 | 0 | 1 | 1 | 1 . . . |
| 32-bin: | 0 | 0 | 0 | 0 | 0 | 0 | 0 | 0 | 1 | 1 | 1 . . . |
| 16-bin: | 0 | 0 | 0 | 0 | 0 | 0 | 0 | 0 | 1 | 1 | 1 . . . |
| 8-bin: | 0 | 0 | 0 | 0 | 0 | 0 | 0 | 0 | 1 | 1 | 1 . . . |
| 4-bin: | 0 | 0 | 0 | 0 | 0 | 0 | 0 | 0 | 1 | 1 | 1 . . . |
| 2-bin: | 0 | 0 | 0 | 0 | 0 | 0 | 0 | 0 | 1 | 1 | 1 . . . |
| 1-bin: | 0 | 0 | 0 | 0 | 0 | 0 | 0 | 0 | 1 | 1 | 1 . . . |
| Sum: | 128 . . . | | | | | | | | 127 . . . | | |

A numerical representation of the effects of applying the bit plane modification represented graphically (80) in FIG. 6 to the same pixels 13 to 23 is provided in Chart 2, below. As can be seen from Chart 2, the pixels activated according to the bit plane of '128' duration remain as intended. However, the later bit planes '64' etc. are displaced leftwards by the respective number of pixels defined in Table 1, resulting in higher overall light output at the displaced pixel positions 16 to 20 as compared with the no-movement brightness level 128 defined in received image data for the image refresh period.

CHART 2

| Bit Plane | Pixels → | | | | | | | | | | |
|---|---|---|---|---|---|---|---|---|---|---|---|
| | 13 | 14 | 15 | 16 | 17 | 18 | 19 | 20 | 21 | 22 | 23 |
| 128-bin: | 1 | 1 | 1 | 1 | 1 | 1 | 1 | 1 | 0 | 0 | 0 . . . |
| 64-bin: | 0 | 0 | 0 | 0 | 0 | 1 | 1 | 1 | 1 | 1 | 1 . . . |
| 32-bin: | 0 | 0 | 0 | 0 | 1 | 1 | 1 | 1 | 1 | 1 | 1 . . . |
| 16-bin: | 0 | 0 | 0 | 1 | 1 | 1 | 1 | 1 | 1 | 1 | 1 . . . |
| 8-bin: | 0 | 0 | 0 | 1 | 1 | 1 | 1 | 1 | 1 | 1 | 1 . . . |
| 4-bin: | 0 | 0 | 0 | 1 | 1 | 1 | 1 | 1 | 1 | 1 | 1 . . . |
| 2-bin: | 0 | 0 | 0 | 1 | 1 | 1 | 1 | 1 | 1 | 1 | 1 . . . |
| 1-bin: | 0 | 0 | 0 | 1 | 1 | 1 | 1 | 1 | 1 | 1 | 1 . . . |
| Sum: | 128 | 128 | 128 | 159 | 191 | 253 | 253 | 253 | 127 | 127 | 127 . . . |

An example HMD system in which embodiments of the present invention may be implemented will now be described in outline with reference to FIG. 8.

Figure 8:
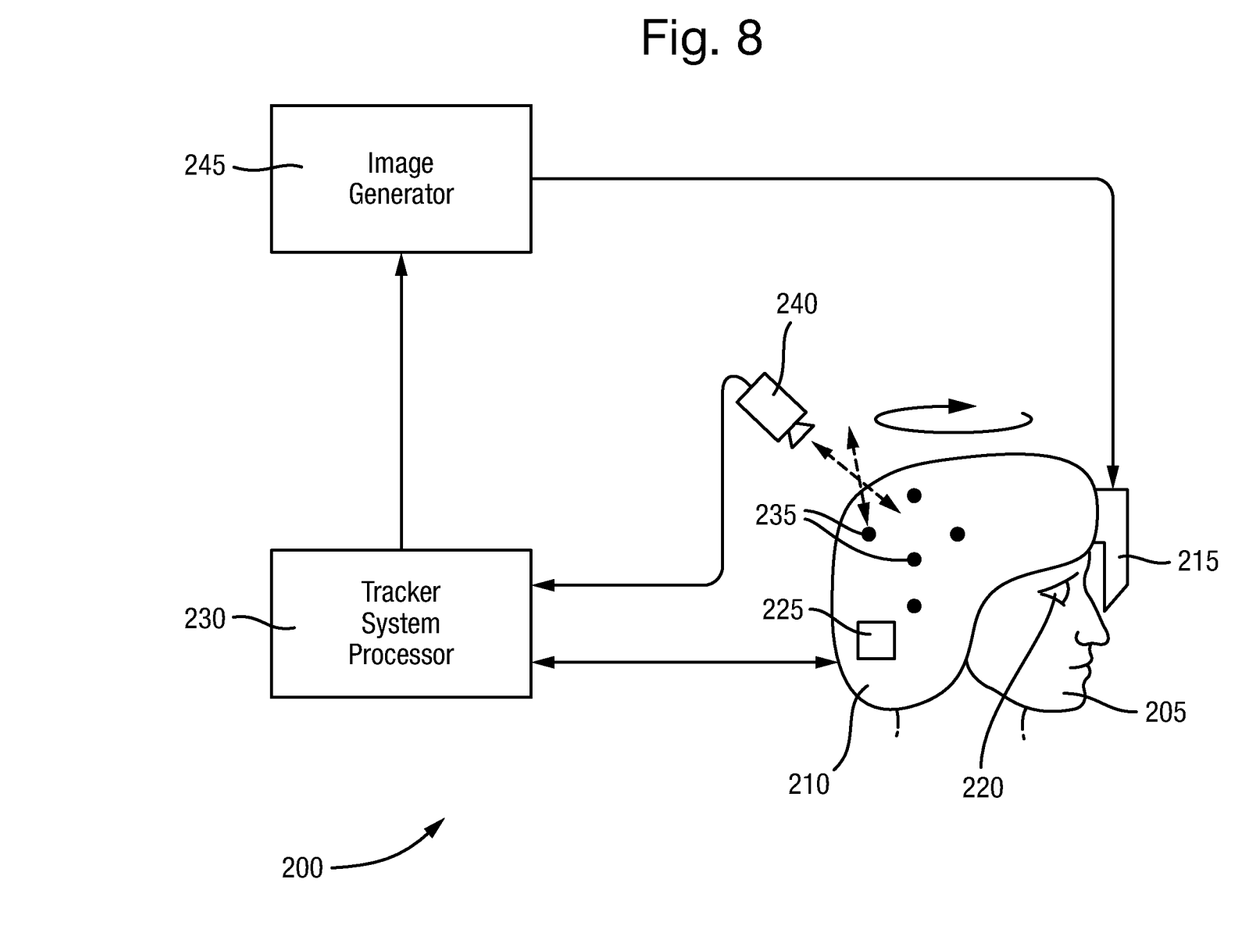
FIG. 8 shows schematically a display apparatus in which example embodiments of the present invention may be implemented.

Referring to FIG. 8, there is shown a representation of an HMD system, for example for use by a pilot 205 wearing a helmet 210 equipped with components of a helmet tracker system and incorporating a helmet-mounted display, in this example a substantially transparent waveguide display 215 positioned in front of an eye 220 of the pilot 205. The tracker system may include one or more inertial sensors 225 mounted upon the helmet 210, arranged to supply data to a Tracker System Processor 230. The tracker system may also include an optical helmet tracker comprising an arrangement of light-emitting diodes (LEDs) 235 integrated within the shell of the helmet 210 and controllable by the Tracker System Processor 230 to emit pulses of light. The optical helmet tracker also includes an arrangement of cameras 240 (only one of which is shown in FIG. 8) at known fixed positions arranged to detect light from the helmet-mounted LEDs 235 and to send corresponding signals to the Tracker System Processor 230.

The Tracker System Processor 230 is arranged to interpret the data received from the inertial sensors 225 and from the cameras 240 of the optical helmet tracker system to determine orientation of the helmet 210 and hence of the display 215 in inertial space or relative to an aircraft for example (not shown in FIG. 8) in which the pilot 205 may be travelling. The Tracker System Processor 230 may also determine a rate of change in orientation of the helmet and hence of the display 215 from those data inputs and output display orientation and rate of change data to an Image Generator 245. The Image Generator 245 is arranged to generate images, including space-stabilised images for display to the pilot viewing the helmet-mounted display 215 such that they appear overlain on the pilot's view through the transparent waveguide 215 of the outside world.

The Image Generator 245 may be arranged to implement the techniques described above for taking account of detected movement of the pilot's eye 220 or direction of gaze relative to the image area of the helmet-mounted display 215, using data from the Tracker System Processor 230, when generating bit plane data for controlling the state of pixels displaying space-stabilised symbols.

Whereas example embodiments of the present invention have been described in the specific context of a head or helmet-mounted display using 8-bit image data and a PWM scheme weighted according to powers of 2, it would be apparent to a person of ordinary skill in the relevant art how the present invention may be arranged to operate and to achieve equivalent advantages using other than 8-bit image data, a PWM scheme including non-binary-weighted bit planes and respective pulse durations and using more than 8 pulse periods within an image refresh period.

The invention claimed is:

1. A method for controlling a digital display device to generate an image for viewing by a user at a display, wherein the display device is arranged to generate the image as an array of pixels each of a defined brightness achieved by emitting a respective combination of light pulses of durations defined according to a predetermined pulse width modulation (PWM) scheme, the method comprising:
receiving image data defining a required brightness level for one or more pixels during an image refresh period;
determining control data defining those pixels required to emit a light pulse of each defined pulse duration of the predetermined PWM scheme to achieve the respective required pixel brightness levels;
receiving rate data from an associated tracker system, or deriving rate data from orientation data output therefrom, defining a rate of movement of a direction of gaze of an eye of the user relative to the display;
calculating, using the rate data and data defining predetermined characteristics of the display and operation thereof, a displaced pixel position relative to an intended pixel position for each defined pulse of the predetermined PWM scheme;
modifying the control data for displaying each pixel at the displaced pixel position; and
outputting the modified control data to the display device.

2. The method according to claim 1, wherein the predetermined characteristics include relative timings of light pulses of each available duration as defined according to the predetermined PWM scheme.

3. The method according to claim 2, wherein the relative timings are determined with respect to the timing of the first pulse within an image refresh period.

4. The method according to claim 2, wherein the relative timings of light pulses are determined with respect to a mid-point of each pulse.

5. The method according to claim 1, wherein the rate data are generated to define a rate of movement in the direction of gaze of the eye of the user relative to the display both in azimuth and in elevation.

6. The method according to claim 5, wherein a pixel displacement in azimuth is calculated separately from a pixel displacement in elevation such that the displaced pixel position is calculated as a vector displacement whose components comprise the separately calculated displacements in azimuth and in elevation.

7. The method according to claim 1, wherein the received image data define pixel brightness as an 8-bit binary number.

8. The method according to claim 7, wherein the predetermined PWM scheme defines eight different pulse durations of relative duration proportional to a respective power of 2.

9. The method according to claim 1, wherein the display is a head or helmet-mounted display (HMD) and the tracker system comprises a processor for determining changes in orientation of the HMD which, when the image comprises a feature intended to appear to a user of the HMD to be in fixed position relative to line of sight to a point in inertial space, is used to indicate relative movement of the direction of gaze of the user and the HMD.

10. An image processor for a digital display system, arranged to implement the method according to claim 1.

11. A digital display apparatus comprising:
a display device arranged to generate an image for display as an array of pixels; and
an image processor for controlling the display device to generate an image according to a predetermined pulse width modulation (PWM) scheme whereby a defined pixel brightness is achieved at the display device as a respective combination of light pulses, emitted by the display device within an image refresh period, of durations defined according to the predetermined PWM scheme, wherein the image processor is arranged to
receive image data defining a required brightness level for one or more pixels during an image refresh period;
receive rate data defining a rate of relative movement of a display of the apparatus and a direction of gaze of an eye of a user;
determine control data defining those pixels required to emit a light pulse of each defined pulse duration according to the predetermined PWM scheme to achieve the pixel brightness levels defined in the received image data;

calculate, using the received rate data and using data defining predetermined characteristics of the display apparatus and operation thereof, a displaced pixel position relative to an intended pixel position for each defined pulse of the predetermined PWM scheme;

modify the determined control data for displaying each pixel at the displaced pixel position; and output the modified control data to the display device.

12. The apparatus according to claim 11, wherein the predetermined characteristics include relative timings of light pulses of each available duration as defined according to the predetermined PWM scheme.

13. The apparatus according to claim 12, wherein the relative timings are determined with respect to the timing of the first pulse within an image refresh period.

14. The apparatus according to claim 11, wherein the predetermined characteristics of the display include the angular size of a pixel of the display.

15. The apparatus according to claim 11, wherein the rate data are generated to define a rate of movement of the direction of gaze of the eye of the user relative to the display both in azimuth and in elevation.

16. The apparatus according to claim 15, wherein the image processor is arranged to calculate a pixel displacement in azimuth separately from a pixel displacement in elevation such that the displaced pixel position is calculated as a vector displacement whose components comprise the separately calculated displacements in azimuth and in elevation.

17. The apparatus according to claim 11, wherein the received image data define pixel brightness as an 8-bit binary number.

18. The apparatus according to claim 11, wherein the predetermined PWM scheme defines eight different pulse durations of relative duration proportional to a respective power of 2.

19. The apparatus according to claim 11, wherein the rate data are generated by an eye tracker system arranged to determine changes in gaze direction of the user's eye relative to the display.

20. The apparatus according to claim 11, wherein the display is a head or helmet-mounted display (HMD) and the received rate data define changes in orientation of the HMD which, when the image comprises a feature intended to appear to a user of the HMD to be in fixed position relative to line of sight to a point in inertial space, is used to indicate relative movement of the direction of gaze of the user and the HMD.

21. A computer program product comprising one or more non-transitory computer-readable mediums storing computer program code which when executed by one or more processors cause a process to be carried out for controlling a digital display device to generate an image for viewing by a user at a display, wherein the display device is arranged to generate the image as an array of pixels each of a defined brightness achieved by emitting a respective combination of light pulses of durations defined according to a predetermined pulse width modulation (PWM) scheme, the process comprising:

receiving image data defining a required brightness level for one or more pixels during an image refresh period;

determining control data defining those pixels required to emit a light pulse of each defined pulse duration of the predetermined PWM scheme to achieve the respective required pixel brightness levels;

receiving rate data from an associated tracker system, or deriving rate data from orientation data output therefrom, defining a rate of movement of a direction of gaze of an eye of the user relative to the display;

calculating, using the rate data and data defining predetermined characteristics of the display and operation thereof, a displayed pixel position relative to an intended pixel position for each defined pulse of the predetermined PWM scheme;

modifying the control data for displaying each pixel at the displaced pixel position; and outputting the modified control data to the display device.

22. The computer program product according to claim 21, wherein the predetermined characteristics include relative timings of light pulses of each available duration as defined according to the predetermined PWM scheme.

23. The computer program product according to claim 21, wherein the rate data are generated to define a rate of movement in the direction of gaze of the eye of the user relative to the display both in azimuth and in elevation.

24. The computer program product according to claim 21, wherein the received image data define pixel brightness as an 8-bit binary number.

25. The computer program product according to claim 21, wherein the display is a head or helmet-mounted display (HMD) and the tracker system comprises a processor for determining changes in orientation of the HMD which, when the image comprises a feature intended to appear to a user of the HMD to be in fixed position relative to line of sight to a point in inertial space, is used to indicate relative movement of the direction of gaze of the user and the HMD.

* * * * *